(12) United States Patent
Kim et al.

(10) Patent No.: US 10,833,888 B2
(45) Date of Patent: Nov. 10, 2020

(54) IOT DEVICE PLUG-IN METHOD AND DEVICE IN DATA ANALYSIS-BASED AUTOMATION SYSTEMS

(71) Applicant: ELECTRONICS AND TELECOMMUNICATIONS RESEARCH INSTITUTE, Daejeon (KR)

(72) Inventors: Mal Hee Kim, Daejeon (KR); Nae Soo Kim, Daejeon (KR); Seong Ik Cho, Daejeon (KR); Cheol Sig Pyo, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 150 days.

(21) Appl. No.: 16/169,888

(22) Filed: Oct. 24, 2018

(65) Prior Publication Data

US 2019/0190737 A1 Jun. 20, 2019

(30) Foreign Application Priority Data

Dec. 20, 2017 (KR) .................. 10-2017-0176202

(51) Int. Cl.
*G06F 16/901* (2019.01)
*H04L 12/28* (2006.01)
*G06N 5/02* (2006.01)
*H04L 29/08* (2006.01)
*G05D 1/00* (2006.01)
*G05B 15/02* (2006.01)

(52) U.S. Cl.
CPC .......... *H04L 12/282* (2013.01); *G06F 16/901* (2019.01); *G06N 5/025* (2013.01); *H04L 12/2827* (2013.01); *H04L 67/12* (2013.01); *H04L 67/125* (2013.01); *H04L 67/22* (2013.01)

(58) Field of Classification Search
CPC ............ G05B 2219/2642; G05B 15/02; G05B 2219/37533; G05D 1/0088; G06F 16/901; H04L 12/2827; H04L 67/12; H04L 67/125; H04L 67/22; H04L 12/282; G06N 5/025
USPC ........................................... 700/90
See application file for complete search history.

(56) References Cited

U.S. PATENT DOCUMENTS

| 8,112,506 | B2 | 2/2012 | Son et al. |
| 2012/0232701 | A1 | 9/2012 | Carty et al. |
| 2014/0163753 | A1 | 6/2014 | Brady et al. |
| 2015/0045966 | A1 | 2/2015 | Chen |
| 2015/0268647 | A1 | 9/2015 | Ko et al. |
| 2017/0111373 | A1* | 4/2017 | Morton ............... H04L 63/0209 |
| 2017/0295032 | A1* | 10/2017 | Shin .................... H04L 12/2814 |

OTHER PUBLICATIONS

"Information technology—Sensor networks—Generic Sensor Network Application Interface", ISO/IEC 30128, Nov. 15, 2014, pp. 1-6.

* cited by examiner

Primary Examiner — Michael J Brown

(57) ABSTRACT

An automatic configuration device, for an Internet-of-Things (IoT) device, which operates a data analysis-based automation system includes when various types of IoT devices are registered in a system, a data analysis-based automation system for supporting both use of functions of the IoT devices and an effective analysis of collected data.

21 Claims, 12 Drawing Sheets

IOT DEVICE PLUG-IN METHOD AND DEVICE IN DATA ANALYSIS-BASED AUTOMATION SYSTEMS

CROSS-REFERENCE TO RELATED APPLICATION

This application claims priority to and the benefit of Korean Patent Application No. 10-2017-0176202, filed on Dec. 20, 2017, the disclosure of which is incorporated herein by reference in its entirety.

BACKGROUND

1. Field of the Invention

The present invention relates to an automatic configuration method and device for an Internet-of-Things (IoT) device, and more specifically, to an automatic configuration method and device, for an IoT device, in which when a new IoT device is registered or registration information of a registered IoT device is reconfigured, functional usage of the IoT device or usage of provided information thereof are automatically set optimally in a whole system on the basis of information regarding specifications of the IoT device.

2. Discussion of Related Art

Nowadays, Internet of Things (IoT) technology enables all physical/virtual objects to be connected via the Internet so that desired data can be mutually used or a cooperative work can be performed through mutual control.

A machine learning technique is a technique for providing information such as prediction/classification/pattern analysis information through data-based learning and inference on the basis of a given task.

A semantic technique is a technique whereby a designer who has domain knowledge may generate a series of models related to recognition and control of a phenomenon and provide information/automatic control based on the models or support expansion/recycling of the domain knowledge on the basis of new information.

With the rapid technical development of current IoT and artificial knowledge fields, systems have effectively emerged which are capable of providing intelligent services using a wide variety of devices connectable to the Internet on the basis of whether a current situation is a real-time situation.

In particular, in smart buildings, smart offices, smart homes, smart factories, etc., various situations may occur in certain sized spaces and thus intelligent automation services are needed wherein, among occurring situations, primary situations are identified and devices for optimally handling the primary situations are selected and operated. Accordingly, many services which may be deployed on a commercial scale are expected to be introduced in the near future.

It is very important to install/operate various types of sensors to identify situations occurring in such a large-sized space, and install/operate an actuator for appropriately handling the situations. Technology therefor may be considered as core element technology.

However, devices which are being currently used in smart buildings, smart homes, etc., are merely capable of supporting automatic registration of several devices for remote control or large numbers of sensors and actuators remain at a fixed registration/operation level through presetting. Accordingly, dynamic intelligent spaces, such as buildings, offices, homes, factories, etc., (in which devices will be frequently installed/replaced/visioned up/deleted) which will be introduced in the near future cannot be effectively supported.

SUMMARY OF THE INVENTION

To address the problem of the related art, the present invention is directed to an automatic configuration method and device, for an Internet-of-Things (IoT) device, to operate, when various types of IoT devices are registered in a system, a data analysis-based automation system for supporting both use of functions of the IoT devices and an effective analysis of collected data.

To this end, the present invention provides an automatic configuration method for devices to be used for an intelligent space system by using IoT technology, semantic technology, and machine learning technology.

Aspects of the present invention are, however, not limited thereto and other aspects not mentioned herein will be apparent to those of ordinary skill in the art from the following description.

According to an aspect of the present invention, an automatic configuration device, for an Internet-of-Things (IoT) device, which operates a data analysis-based automation system includes at least one IoT device including specification information and configured to provide the specification information when plugged in; an automation domain knowledge database configured to store a control rule for designating a cluster for a control IoT terminal and a function of the IoT device corresponding to a control scenario; a data set domain knowledge database configured to store a sensing rule for assigning plugged-in sensor information to a data set; and a specification manager configured to determine whether the specification information corresponds to the cluster for the control IoT terminal or a sensing IoT device for monitoring when the specification information is received as the IoT device is plugged in, configured to transmit the specification information to the automation domain knowledge database when the specification information corresponds to the cluster for the control IoT terminal, and configured to transmit the specification information to the data set domain knowledge database when the specification information corresponds to the sensing IoT device for monitoring.

In one embodiment of the present invention, the automatic configuration device may further include a controller configured to trigger device control on the IoT device, which is determined by the control rule stored in the automation domain knowledge database, using a control parameter according to the control rule; and a data analyzer configured to analyze sensing information collected from the IoT device according to the sensing rule stored in the data set domain knowledge database and configured to provide a result of analyzing the sensing information to the controller.

Here, the specification information stored in the IoT device may include a general specification part including owner information, manufacturer information, location information, and device type information; and at least one of a controller-related part including information regarding a function and an operational method of the IoT device to automate the IoT device at a later desired time, and a sensor-related part including sensing type information to be provided.

The sensor-related part may include a sampling cycle, information regarding a range of effective ranges, and information regarding available services.

The automation domain knowledge database may include a control group manager configured to compare the specification information of the currently plugged-in IoT device with a specified control rule, and assign the specification information to the cluster corresponding thereto. The control group manager may assign the cluster for the plugged-in IoT device by comparing specified information of the IoT device with predetermined cluster specifications.

The automation domain knowledge database may include a control scenario manager configured to manage the control scenario for using the IoT device according to a situation analyzed on the basis of sensor data collected in real time from the IoT device. When a desired event occurs or a set condition is satisfied, the control scenario manager may operate clusters for the control IoT terminal according to predetermined control scenario information and update the control rule stored in the automation domain knowledge database and the sensing rule.

The data set domain knowledge database may include a sensing data set manager configured to compare specifications of each data set with data specifications from the plugged-in IoT device and assign information regarding the IoT device to a specific data set. The sensing data set manager may collect and store sensing data, which is received in real time and supplied to a building energy management system (BEMS), according to the assigned data set.

Here, the IoT device may be a sensing IoT terminal or the control IoT terminal.

The data analyzer may collect sensing data corresponding to a specific data set through a data set manager when sensing data is received in real time from the registered IoT device, analyze the sensing data received in real time according to a predetermined analysis method, and transmit a result of analyzing the sensing data to the automation domain knowledge database and a recommended domain knowledge database.

Furthermore, the data analyzer may perform control on the basis of a predetermined rule and a rule expanding in real time and may visualize information.

According to another aspect of the present invention, an automatic configuration method, for an Internet-of-Things (IoT) device, to operate a data analysis-based automation system includes receiving, by a specification manager, specification information from an IoT device, the IoT device connected to the specification manager to be plugged in and including the specification information; determining, by the specification manager, whether the received specification information of the IoT device corresponds to a control IoT terminal; when it is determined that the specification information corresponds to the control IoT terminal, transmitting, by the specification manager, the specification information to an automation domain knowledge database; and when it is determined that the specification information corresponds to a sensing IoT device for monitoring, transmitting, by the specification manager, the specification information to a data set domain knowledge database.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving them will be apparent from embodiments to be described in detail herein in conjunction with the accompanying drawings. However, the present invention is not limited to the embodiments set forth herein and may be embodied in many different forms. Rather, the embodiments are provided so that this disclosure will be thorough and complete and will fully convey the concept of the invention to those of ordinary skill in the art. The present invention should be defined by the claims appended herein. The terminology used herein is for the purpose of describing embodiments only and is not intended to be limiting to the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated components, steps, operations, and/or elements, but do not preclude the presence or addition of one or more other components, steps, operations, and/or elements.

Figure 1:
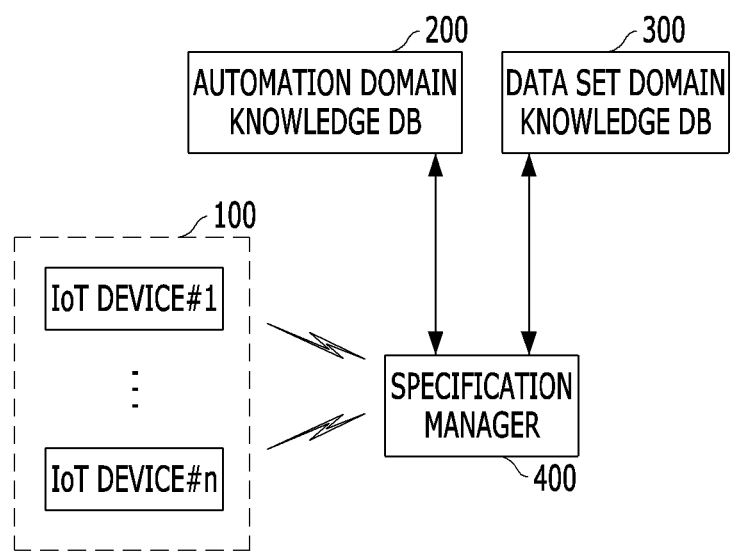
FIG. 1 is a block diagram of an automatic configuration device, for an Internet-of-Things (IoT) device, which operates a data analysis-based automation system according to an embodiment of the present invention.

FIG. 1 is a block diagram of an automatic configuration device, for an Internet-of-Things (IoT) device, which operates a data analysis-based automation system according to an embodiment of the present invention. As illustrated in FIG. 1, the automatic configuration device, for an IoT device, which operates a data analysis-based automation system according to an embodiment of present invention includes IoT devices 100, an automation domain knowledge database 200, a data set domain knowledge database 300, and a specification manager 400.

The IoT devices 100 store specification information and provide the specification information to the specification manager 400 when plugged in. The IoT devices 100 may include a sensing IoT terminal 100 configured to sense external information, and a control IoT terminal 120 such as a TV, an air conditioner, a dehumidifier, or an electric lamp.

After the IoT devices 100 are plugged in and registered, the IoT devices 100 are operated under control of the specification manager 400.

The automation domain knowledge database 200 stores a control rule for designating a cluster for the control IoT terminal 120 and a function of the IoT device 100 corresponding to a control scenario. In this case, the control rule may be previously specified by a domain expert. Here, the cluster may be variously configured in units of domains, e.g., lighting, temperature, humidity, security, etc.

The data set domain knowledge database 300 stores a sensing rule for assigning sensor information of the IoT device 100 plugged in to a data set. In this case, the sensing rule may be previously specified by a domain expert. Here, the data set domain knowledge database 300 may be embodied through an external semantic modeler.

Upon receiving the specification information from the IoT device 100 as the IoT device 100 is plugged in, the specification manager 400 determines whether the specification information corresponds to the control IoT terminal 120 or the sensing IoT terminal 110 for monitoring.

The specification manager 400 transmits the specification information to the automation domain knowledge database 200 when it is determined that the specification information corresponds to the control IoT terminal 120 and transmits the specification information to the data set domain knowledge database 300 when it is determined that the specification information corresponds to the sensing IoT terminal 110 for monitoring.

Here, the specification manager 400 extracts a general specification part and a controller-related part from the specification information and transmit them to the automation domain knowledge database 200 when the specification information corresponds to the control IoT terminal 120, and extracts the general specification part and a sensor-related part from the specification information and transmits them to the data set domain knowledge database 300 when the specification information corresponds to the sensing IoT terminal 110.

Here, the general specification part includes various types of information, such as user information, manufacturer information, hardware version information, software version information, communication protocol information, location information, and device type information. The controller-related part may include control type information such as illumination control and air conditioning control, control configuration information including control parameters, e.g., basic set values, and connection protocol information. The sensor-related part may include sensing type information such as temperature, humidity, and carbon dioxide concentration, and information such as sampling information and range information.

In an embodiment of the present invention, specification information may be received from an IoT device plugged in, a function of the IoT device may be determined using the specification information, and the specification information may be registered to be mapped to the function of the IoT device so that the IoT device may be automatically registered without human intervention, data from the IoT device may be analyzed, and the IoT device may be controlled.

Figure 2:
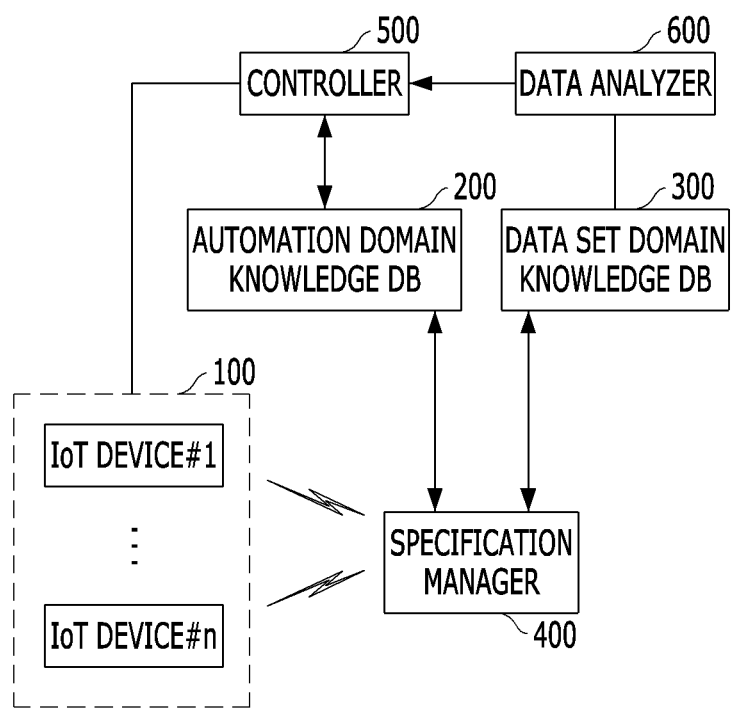
FIG. 2 is a block diagram of an automatic configuration device, for an IoT device, which operates a data analysis-based automation system according to another embodiment of the present invention.

FIG. 2 is a block diagram illustrating an automatic configuration device, for an IoT device, which operates a data analysis-based automation system according to another embodiment of the present invention.

As illustrated in FIG. 2, the automatic configuration device, for an IoT device, which operate a data analysis-based automation system according to the other embodiment of the present invention further includes a controller 500 and a data analyzer 600 as compared to the previous embodiment.

The controller 500 controls a control IoT terminal 120 by triggering the control IoT terminal 120 by transmitting a control parameter to the control IoT terminal 120 according to a control rule registered with an automation domain knowledge database 200.

Here, IoT devices 100 may be embodied according to various communication protocols (a wireless communication protocol such as Bluetooth or Wi-Fi) but are not limited thereto.

In this case, the controller 500 adds, changes, deletes, and manages information stored in the automation domain knowledge database 200 and information stored in a data set domain knowledge database 300 to set communication with the IoT devices 100 and expand a manner of operating the IoT devices 100. As described above, in an embodiment of the present invention, manners of setting/operating performed by the controller 500 may be added, deleted, or changed in cluster (module) units, and manners of setting/operating only fixed type IoT devices 100 may be added and operated beforehand according to circumstances.

The data analyzer 600 collects sensing information from a sensing IoT terminal 110 and analyzes the sensing information according to a sensing rule stored in the data set domain knowledge database 300.

Furthermore, the data analyzer 600 provides a result of analyzing the sensing information to the controller 500 to control a control IoT terminal 120 and updates a control rule stored in the automation domain knowledge database 200.

The data analyzer 600 may perform triggering on the result of analyzing the sensing information such that this result is visualized to a user or information thereof is provided to the user based on recommended domain knowledge (not shown).

A type of an analysis performed by the data analyzer 600 and specifications thereof to achieve optimization may be based on a domain knowledge database (automation domain knowledge or recommended domain knowledge) or may be internally and fixedly specified.

Specification information stored in the IoT device 100 according to an embodiment of the present invention may include a general specification part including owner information, manufacturer information, location information, and device type information representing whether the IoT device 100 is a control IoT terminal performing driving or a sensing IoT terminal performing sensing.

The specification information stored in the IoT device 100 may be classified as a controller-related part including information regarding a function, an operational method, etc. of the IoT device 100 so that the IoT device 100 may be automated at a later desired time, or a sensor-related part including sensing information to be provided.

Here, the sensor-related part may include a sampling cycle, information regarding a range of effective values, and information regarding available services. For example, the sensor-related part may include information such as temperature, humidity, and carbon dioxide concentration but is not limited thereto and may include various types of sensing information.

Figure 3:
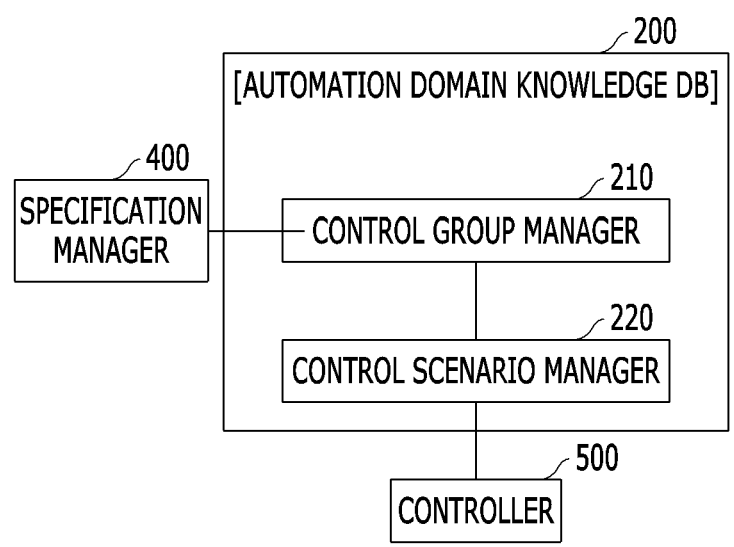
FIG. 3 is a block diagram illustrating an automation domain knowledge database according to an embodiment of the present invention.

FIG. 3 is a block diagram illustrating an automation domain knowledge database according to an embodiment of the present invention.

As illustrated in FIG. 3, an automation domain knowledge database 200 according to an embodiment of the present invention includes a control group manager 210 and a control scenario manager 220.

The control group manager 210 compares specification information of a currently plugged-in IoT device 100 with a specified control rule and generates, assigns, or changes a cluster corresponding to the specification information.

The control scenario manager 220 may operate the IoT device 100 according to a control scenario according to a situation analyzed on the basis of sensor data collected in real time.

When a desired event (a result of analyzing sensing value-based real-time data) occurs or a set condition is satisfied through analyzing sensing data or according to a control scenario, the control scenario manager 220 operates control IoT terminals 120 according to a predetermined control scenario and updates a control rule stored in the automation domain knowledge database 200 and a sensing rule stored in the data set domain knowledge database 300.

When an abnormal operation of the IoT device 100 is detected, the control scenario manager 220 deletes the abnormal IoT device 100 from a cluster and replaces the abnormal defective IoT device 100 with another IoT device 100 operating normally.

The control rule stored in the automation domain knowledge database 200 may be set in units of clusters through an external semantic modeler or may be set on the basis of a pattern identified through machine learning.

Figure 4:
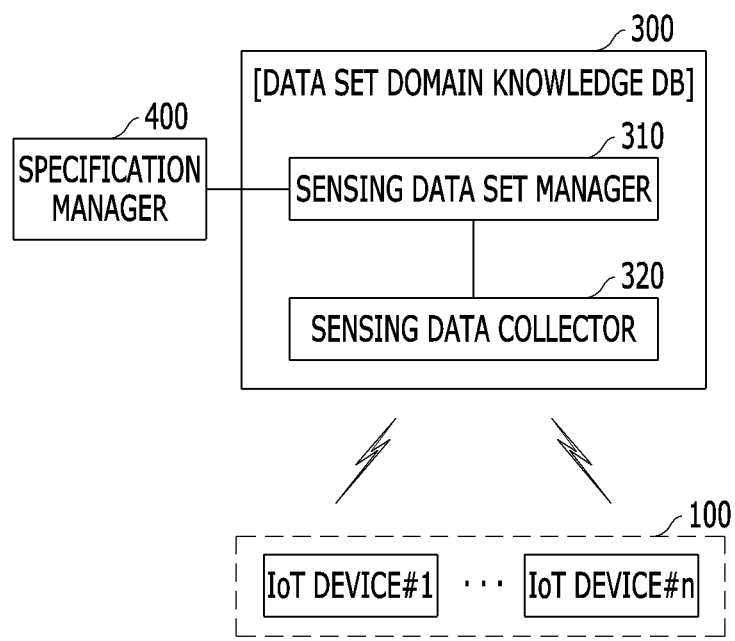
FIG. 4 is a block diagram illustrating a data set domain knowledge database according to an embodiment of the present invention.

FIG. 4 is a block diagram illustrating a data set domain knowledge database according to an embodiment of the present invention.

As illustrated in FIG. 4, a data set domain knowledge database 300 according to an embodiment of the present invention further includes a sensing data set manager 310 configured to compare specification of each data set with that of data from a plugged-in IoT device 100 according to a sensing rule and assigns information of the IoT device 100 to a specific data set.

The sensing data set manager 310 collects and stores sensing data received in real time from a sensing IoT terminal 110 using the assigned data set so that the sensing data may be analyzed by the data analyzer 600.

A process of operating the data analysis-based automation system according to the embodiment of the present invention will be described below.

First, when sensing data is collected from the registered IoT device 100, the sensing data set manager 310 accumulatively stores the sensing data in a specific data set according to a sensing rule, and the data analyzer 600 analyzes the stored sensing data according to a predetermined analysis method.

The data analyzer 600 transmits information obtained by analyzing the sensing data to the automation domain knowledge database 200 and a recommended domain knowledge database (not shown). Furthermore, the data analyzer 600 controls the IoT device 100 on the basis of a predetermined control rule and a control rule expanding in real time or visualizes and provides collected sensing data to a user. Here, a type of analysis to be performed by the data analyzer 600 and a data set to be used for the analysis are determined using automation domain specialized knowledge and recommended domain knowledge which are to be used.

A process of operating a data analysis-based automation system when an IoT device 100 is added according to an embodiment of the present invention will be described below.

Figure 5:
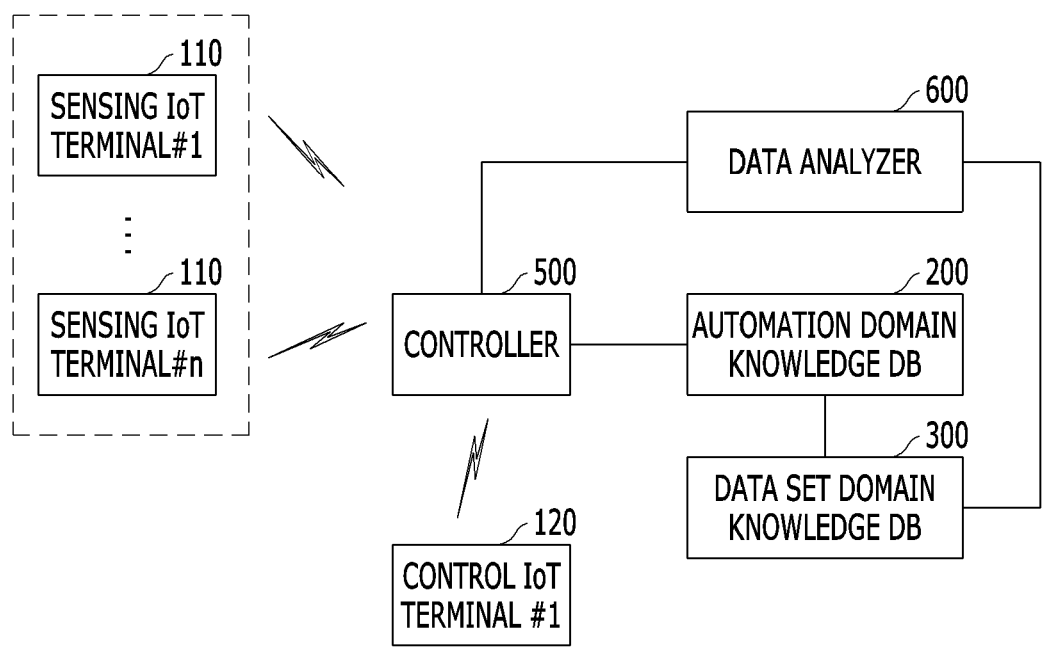
FIG. 5 is a reference diagram illustrating an operation of an automatic configuration device, for an IoT device, which operates a data analysis-based automation system according to an embodiment of the present invention.

A state in which a control IoT terminal 120, e.g., an air conditioner, is installed will be described with respect to an embodiment illustrated in FIG. 5 below.

First, it is assumed that the control IoT terminal 120, e.g., the air conditioner, is installed, and a control scenario among control rules previously modeled and stored in an automation domain knowledge database 200 is "Turn on the air conditioner with parameters (mode: refrigeration/dehumidification, level value: a refrigeration or dehumidification level value) where a data set is provided.".

Then, a data analyzer 600 analyzes an operational mode and an operation level value of the control IoT terminal 120, i.e., the air conditioner, on the basis of indoor temperature information and humidity information which are sensing data collected in real time from a sensing IoT terminal 110. Here, the sensing data is real-time sensing data (temperature information and humidity information) collected from the sensing IoT terminal 110.

An analysis value obtained by analyzing the operational mode and the operation level value is provided to the controller 500. The controller 500 controls the control IoT terminal 120 by applying the analysis value on the basis of parameters of the control scenario manager 220 of the automation domain knowledge database 200.

The data analyzer 600 performs prediction and learning on the basis of the sensing data and a mode value and a level value of the air conditioner. For example, the data set may include location, temperature values, and humidity values, and models such as classifier(s) (e.g., a support vector machine (SVM), convolutional neural network (CNN), recurrent neural network (RNN), tree-based, various ensembles, etc.) may be used as an analysis model.

In this case, outputs of the analysis model are classified independently using the mode value and the level value or using a combination thereof. That is, modes and levels may be individually classified using different analysis models or may be combined and processed using one model.

Alternatively, a single control IoT terminal 120 may be driven or a plurality of control IoT terminals 120 may be driven together using the outputs of the analysis model according to a previously modeled control scenario of the automation domain knowledge database 200.

Such a specific control scenario may be based on a control scenario modeled previously by a domain expert, but the present invention is not limited thereto and an algorithm such as a machine learning method may be used.

Figure 6:
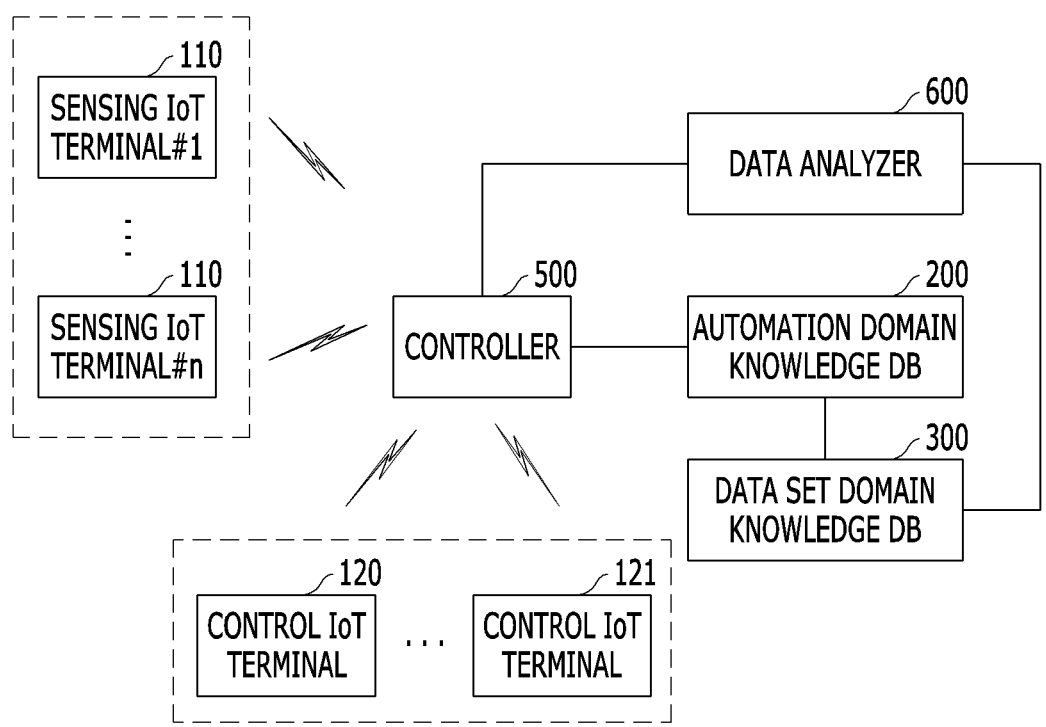
FIG. 6 is a reference diagram illustrating a process of operating a data analysis-based automation system, the process being performed by an automatic configuration device, for an IoT device, to operate a data analysis-based automation system when a failure occurs according to an embodiment of the present invention.

As illustrated in FIG. 6, when an error occurs in a control IoT terminal 120, an automation domain knowledge database 200 provides a control rule to a controller 500 so that another control IoT terminal 121 which may replace the control IoT terminal 120 may be dynamically mapped again.

Then, the controller 500 ends control of the control IoT terminal 120 in which the error occurs and maps the control IoT terminal 121 operating normally to be controlled on the basis of the control rule provided from the automation domain knowledge database 200, thereby stably performing an automation function.

A process of operating the data analysis-based automation system when the control IoT device 100 is added according to the embodiment of the present invention will be described below.

First, a refrigeration/dehumidification function of the current control IoT terminal 120, e.g., the air conditioner, is on or off on the basis of threshold values of temperature and humidity, and temperature and humidity of the air conditioner are controlled on the basis of a predetermined control scenario.

Figure 7:
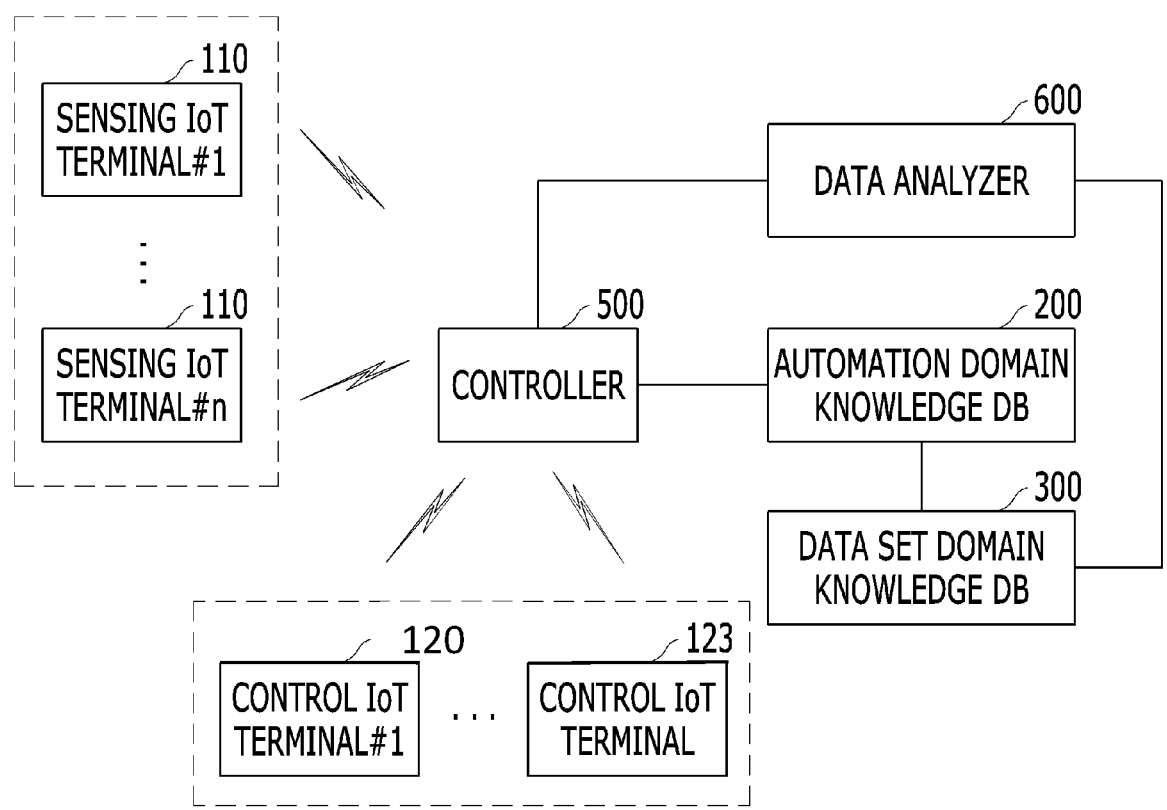
FIG. 7 is a reference diagram illustrating a process of operating a data analysis-based automation system, the process being performed by operating an automatic configuration device, for an IoT device, to operate the data analysis-based automation system when an IoT device is added according to an embodiment of the present invention.

When a control IoT terminal 123, e.g., a dehumidifier, is added as illustrated in FIG. 7, the added control IoT terminal 123, e.g., the dehumidifier, is added to a device cluster for dehumidification by the control group manager 210 of the automation domain knowledge database 200, and a dehumidification scenario is added by the control scenario manager 220.

Here, the dehumidification scenario may be changed to selectively drive the control IoT terminal 120, e.g., the air conditioner, and the added control IoT terminal 123, e.g., the dehumidifier, if necessary.

As described above, after the control IoT terminal 123 (the dehumidifier) is additionally installed, the data analyzer 600 collects and analyzes temperature/humidity information collected by the sensing IoT terminal 110.

A result of analyzing the temperature/humidity information is provided to the controller 500, and the controller 500 compares the result of analyzing the temperature/humidity information with a control rule stored in the automation domain knowledge database 200.

In this case, when temperature is appropriate but humidity is high, the controller 500 transmits a control parameter to the control IoT terminal 123 (the dehumidifier) so as to drive the control IoT terminal 123 (the dehumidifier) according to the control rule stored in the automation domain knowledge database 200, i.e., the control scenario. When both temperature and humidity are greater than threshold values thereof, a mode of the control IoT terminal 120 (the air conditioner) is set with respect to both refrigeration and dehumidification, and a parameter is transmitted to the control IoT terminal 120 (the air conditioner) to operate the control IoT terminal 120 (the air conditioner).

Figure 8A:
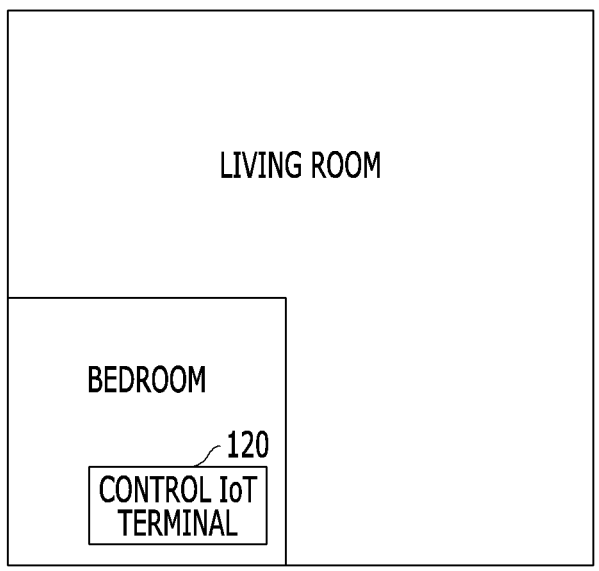
FIGS. 8A and 8B are reference diagrams illustrating examples of a process of operating a data analysis-based automation system, the process being performed by an automatic configuration device, for an IoT device, to operate the data analysis-based automation system when an IoT device is added, according to other embodiments of the present invention.

As illustrated in FIG. 8A, it is assumed that a control IoT terminal 120 (an air conditioner) is installed in a bedroom and a sensing IoT terminal 110 (a temperature sensor) is installed and operated only in a living room.

Figure 8B:
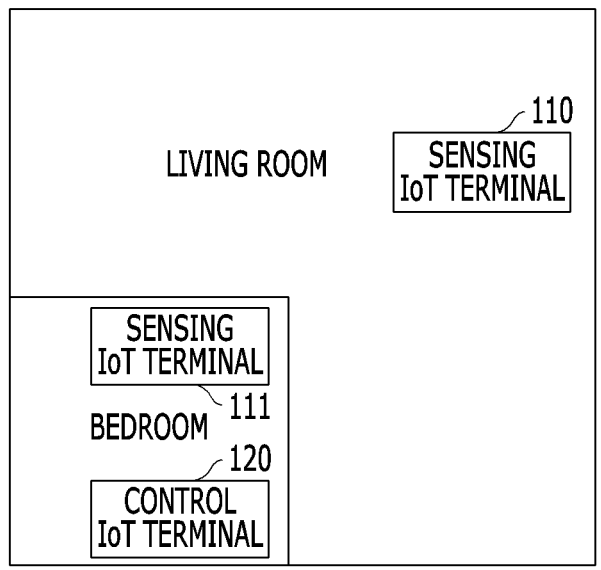

When a sensing IoT terminal 111 (a temperature sensor) is additionally installed in the bedroom as illustrated in FIG. 8B, the sensing IoT terminal 111 (the temperature sensor) is added to a data set supporting a bedroom device automation scenario, and the data set is expanded to be analyzed together with a sensing value of the sensing IoT terminal 110 (the temperature sensor) installed in the living room. Thereafter, the control IoT terminal 120 (the air conditioner) installed in the bedroom is operated by comparing temperature of the bedroom with that of the living room.

In one embodiment of the present invention, specification information is received from a plugged-in IoT device, a function of the IoT device is determined using the specification information, and the specification information of the IoT device is registered to be mapped to the function of the IoT device so that the IoT device may be automatically controlled without human intervention or the specification information may be used to analyze data provided from the IoT device.

Figure 9:
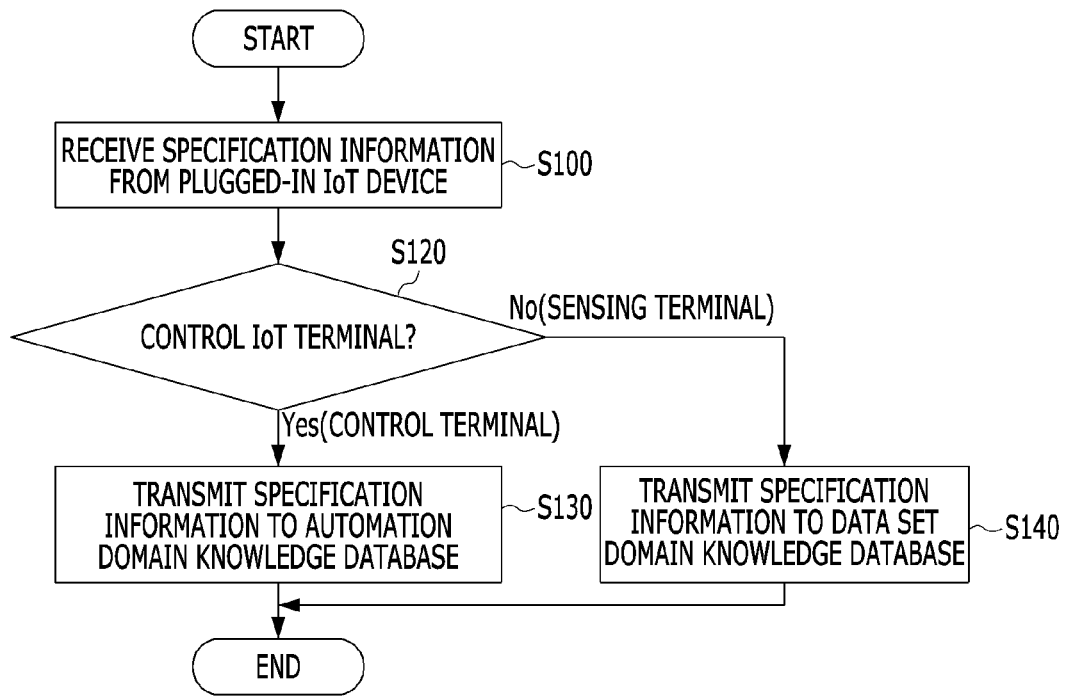
FIG. 9 is a flowchart illustrating an automatic configuration method, for an IoT device, to operate a data analysis-based automation system according to an embodiment of the present invention.

An automatic configuration method, for an IoT device, for operating a data analysis-based automation system according to an embodiment of the present invention will be described with reference to FIG. 9 below.

The automatic configuration method, for an IoT device, for operating a data analysis-based automation system according to the embodiment of the present invention may be performed by a specification manager of an automatic configuration device for an IoT device.

First, the specification manager receives specification information from a plugged-in IoT device (S110).

Next, the specification manager determines whether the specification information received from the IoT device corresponds to a control IoT terminal (S120).

When it is determined in operation S120 that the specification information corresponds to a control IoT terminal (YES), the specification manager transmits the specification information to an automation domain knowledge database (S130).

When it is determined in operation S120 that the specification information corresponds to a sensing IoT terminal for monitoring (NO), the specification manager transmits the specification information to a data set domain knowledge database (S140).

In one embodiment of the present invention, specification information is received from a plugged-in IoT device, a function of the IoT device is determined using the specification information, and the specification information of the IoT device is registered to be mapped to the function of the IoT device so that the IoT device may be automatically controlled without human intervention or the specification information may be used to analyze data provided from the IoT device.

A method of operating a data analysis-based automation system, the method being included in an automatic configuration method, for an IoT device, for operating a data analysis-based automation system according to an embodiment of the present invention will be described below.

Figure 10:
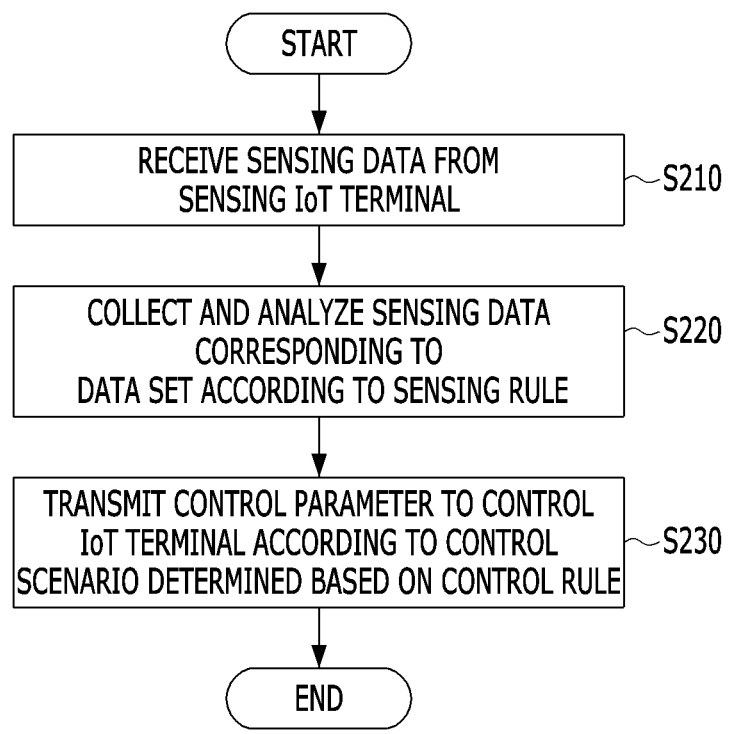
FIG. 10 is a flowchart illustrating an automatic configuration method, for an IoT device, to operate a data analysis-based automation system according to another embodiment of the present invention.

FIG. 10 is a flowchart of an automatic configuration method, for an IoT device, for operating a data analysis-based automation system according to another embodiment of the present invention.

As illustrated in FIG. 10, first, the data analyzer 600 receives sensing data from a sensing IoT terminal 110 among a plurality of IoT devices 100 (S210).

Next, the data analyzer 600 collects and analyzes sensing data corresponding to a data set according to a sensing rule stored in a data set domain knowledge database among collected sensing data (S220).

Thereafter, a controller controls the control IoT terminal 120 by transmitting a control parameter to the control IoT terminal 120 according to a control scenario determined on the basis of information obtained by analyzing the sensing data and a control rule stored in the automation domain knowledge database (S230).

Here, specification information stored in the IoT device 100 may include a general specification part including owner information, manufacturer information, location information, and device type information, and may include at least one of a controller-related part including information regarding a function, an operational method, etc. of the IoT device 100 to automate the IoT device 100 at a later desired time, and a sensor-related part including sensing type information to be provided.

The sensor-related part may include a sampling cycle, information regarding a range of effective values, and information regarding available services.

The IoT device 100 may include a sensing IoT terminal 110 configured to sense external information, and a control IoT terminal 120 such as a TV, an air conditioner, a dehumidifier, and a lamp.

In one embodiment of the present invention, in the collecting and analyzing of the sensing data (S220), the data analyzer 600 may transmit the information obtained by analyzing the sensing data to the automation domain knowledge database and a recommended domain knowledge database.

In the collecting and analyzing of the sensing data (S220), the data analyzer 600 may visualize IoT device control information based on predetermined rules and real-time expanded rule and sensing data.

According to an embodiment of the present invention, specification information is received from a plugged-in IoT device, a function of the IoT device is determined using the specification information, and the specification information of the IoT device is registered to be mapped to the function of the IoT device so that the IoT device can be automatically controlled without human intervention or the specification information can be used to analyze data provided from the IoT device.

Figure 11:
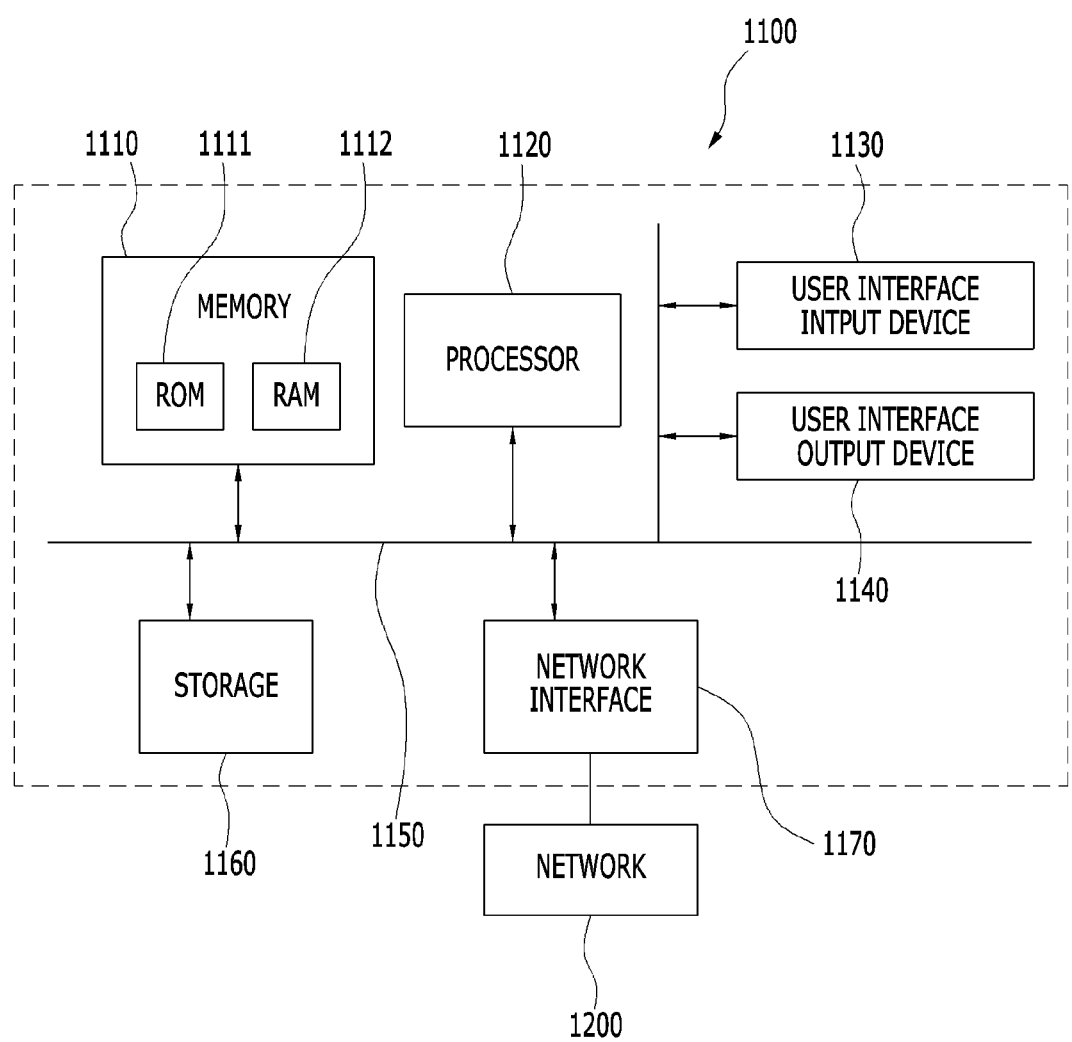
FIG. 11 is a block diagram illustrating a computer system to which the present invention is applied.

FIG. 11 is a block diagram illustrating a computer system to which the present invention is applied.

As shown in FIG. 11, a computer system 1100 may include one or more of a memory 1110, a processor 1120, a user input device 1130, a user output device 1140, and a storage 1160, each of which communicates through a bus 1150. The computer system 1100 may also include a network interface 1170 that is coupled to a network 1200. The processor 1120 may be a central processing unit (CPU) or a semiconductor device that executes processing instruction stored in the memory 1110 and/or the storage 1160. The memory 1110 and the storage 1160 may include various forms of volatile or non-volatile storage media. For example, the memory 1110 may include a read-only memory (ROM) 1111 and a random access memory (RAM) 1112.

Accordingly, an embodiment of the invention may be implemented as a computer implemented method or as a non-transitory computer readable medium with computer executable instruction stored thereon. In an embodiment, when executed by the processor, the computer readable instruction may perform a method according to at least one aspect of the invention.

While the structures of the present invention have been described in detail with reference to the accompanying drawings, they are merely examples and it will be apparent to those skilled in the art that various modifications and changes may be made therein without departing from the spirit or scope of the invention. Accordingly, the scope of the present invention should not be limited by the above-described embodiments and should be determined by the appended claims.

What is claimed is:

1. An automatic configuration device, for an Internet-of-Things (IoT) device, which operates a data analysis-based automation system, the automatic configuration device comprising:

at least one IoT device including specification information and configured to provide the specification information when plugged in;

an automation domain knowledge database configured to store a control rule for designating a cluster for a control IoT terminal and a function of the IoT device corresponding to a control scenario;

a data set domain knowledge database configured to store a sensing rule for assigning plugged-in sensor information to a data set; and a specification manager configured to determine whether the specification information of the IoT device corresponds to a control IoT terminal or a sensing IoT terminal for monitoring when the specification information is received transmit the specification information to the automation domain knowledge database when the specification information corresponds to the control IoT terminal, and transmit the specification information to the data set domain knowledge database when the specification information corresponds to the sensing IoT terminal for monitoring.

2. The automatic configuration device of claim 1, further comprising:

a controller configured to trigger device control on the IoT device, which is determined as a control IoT terminal by the control rule stored in the automation domain knowledge database, using a control parameter according to the control rule; and a data analyzer configured to analyze sensing information collected from sensing IoT terminals according to the sensing rule stored in the data set domain knowledge database and configured to provide a result of analyzing the sensing information to the controller.

3. The automatic configuration device of claim 1, wherein the specification information stored in the IoT device comprises:

a general specification part including owner information, manufacturer information, location information, and device type information; and at least one of a controller-related part including information regarding a function and an operational method of the IoT device to automate the IoT device at a later desired time, and a sensor-related part including sensing type information to be provided.

4. The automatic configuration device of claim 3, wherein the sensor-related part comprises a sampling cycle, information regarding a range of effective ranges, and information regarding available services.

5. The automatic configuration device of claim 1, wherein the automation domain knowledge database comprises a control group manager configured to compare the specification information of the IoT device with the control rule and assign the specification information to a cluster corresponding thereto, when the specification information is determined to correspond to the control IoT terminal.

6. The automatic configuration device of claim 5, wherein the control group manager assigns the cluster for the IoT device by comparing the specification information of the IoT device with predetermined cluster specifications.

7. The automatic configuration device of claim 1, wherein the automation domain knowledge database comprises a control scenario manager configured to manage the control scenario for using the IoT device according to a situation analyzed on the basis of sensing information collected in real time from sensing IoT terminals.

8. The automatic configuration device of claim 7, wherein, when a desired event occurs or a set condition is satisfied, the control scenario manager operates clusters for the control IoT terminal according to predetermined control scenario information and updates the control rule stored in the automation domain knowledge database and the sensing rule.

9. The automatic configuration device of claim 1, wherein the data set domain knowledge database comprises a sensing data set manager configured to compare specifications of each data set with the specification information from the IoT device and assign information regarding the IoT device to a specific data set, when the specification information is determined to correspond to the sensing IoT terminal.

10. The automatic configuration device of claim 9, wherein the sensing data set manager collects and stores sensing information received in real time according to the assigned data set.

11. The automatic configuration device of claim 1, wherein the IoT device comprises one of a sensing IoT terminal and a control IoT terminal.

12. The automatic configuration device of claim 2, wherein the data analyzer collects sensing information corresponding to a specific data set through a data set manager in the data set domain knowledge database when sensing information is received in real time from registered sensing IoT terminals,
wherein the sensing information received in real time is analyzed according to a predetermined analysis method and is transmitted to the automation domain knowledge database and a recommended domain knowledge database.

13. The automatic configuration device of claim 12, wherein the data analyzer visualizes IoT device control information based on a predetermined rule, a rule expanding in real time, and the collected sensing information.

14. An automatic configuration method, for an Internet-of-Things (IoT) device, to operate a data analysis-based automation system, the automatic configuration method comprising:
receiving, by a specification manager, specification information from an IoT device, the IoT device connected to the specification manager to be plugged in and including the specification information;
determining, by the specification manager, whether the received specification information of the IoT device corresponds to a control IoT terminal or a sensing IoT terminal for monitoring;
when it is determined that the specification information corresponds to the control IoT terminal, transmitting, by the specification manager, the specification information to an automation domain knowledge database; and
when it is determined that the specification information corresponds to the sensing IoT terminal for monitoring, transmitting, by the specification manager, the specification information to a data set domain knowledge database.

15. The automatic configuration method of claim 14, further comprising:
receiving, by a data analyzer, sensing data from a plurality of sensing IoT terminals;
collecting and analyzing, by the data analyzer, sensing data corresponding to a data set matching a sensing rule stored in the data set domain knowledge database among the received sensing data; and
controlling, by a controller, the control IoT terminal by transmitting a control parameter to the control IoT terminal according to the analyzed sensing data and a control scenario determined by a control rule stored in the automation domain knowledge database.

16. The automatic configuration method of claim 15, wherein the collecting and analyzing of the sensing data comprises transmitting, by the data analyzer, information obtained by analyzing the collected sensing data to the automation domain knowledge database and a recommended domain knowledge database.

17. The automatic configuration method of claim 16, wherein the collecting and analyzing of the sensing data comprises visualizing, by the data analyzer, IoT device control information based on a predetermined rule and a rule expanding in real time, and the collected sensing data.

18. The automatic configuration method of claim 14, wherein the specification information included in the IoT device comprises:
a general specification part including owner information, manufacturer information, location information, and device type information; and
at least one of a controller-related part including information regarding a function and an operational method of the IoT device to automate the IoT device at a later desired time, and a sensor-related part including sensor type information to be provided.

19. The automatic configuration method of claim 18, wherein the sensor-related part comprises a sampling cycle, information regarding a range of effective ranges, and information regarding available services.

20. The automatic configuration method of claim 14, wherein the IoT device comprises one of a sensing IoT terminal and a control IoT terminal.

21. The automatic configuration method of claim 14, wherein, when it is determined that the specification information corresponds to the control IoT terminal, the method further comprises:
comparing, by the automation domain knowledge database, the specification information of the IoT device with a control rule; and
assigning, by the automation domain knowledge database, the specification information to a cluster corresponding thereto.

* * * * *